(12) United States Patent
Yu

(10) Patent No.: US 7,609,959 B2
(45) Date of Patent: Oct. 27, 2009

(54) AUTOMATIC FOCUSING STRUCTURE AND DIGITAL CAMERA MODULE WITH SAME

(75) Inventor: Tai-Cherng Yu, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 407 days.

(21) Appl. No.: 11/448,574

(22) Filed: Jun. 7, 2006

(65) Prior Publication Data
US 2007/0077050 A1    Apr. 5, 2007

(30) Foreign Application Priority Data
Sep. 30, 2005   (CN)   ................ 2005 1 0100075

(51) Int. Cl.
*G03B 13/34* (2006.01)
(52) U.S. Cl. ................ 396/133; 359/696
(58) Field of Classification Search ............ 396/85, 396/133; 359/676, 694, 696
See application file for complete search history.

(56) References Cited

U.S. PATENT DOCUMENTS

| | | | |
|---|---|---|---|
| 5,675,444 A | * | 10/1997 | Ueyama et al. ............ 359/824 |
| 5,956,532 A | * | 9/1999 | Arita ........................ 396/72 |
| 6,188,530 B1 | * | 2/2001 | Katsuragi .................. 359/824 |
| 2004/0041497 A1 | * | 3/2004 | Hamada et al. ............ 310/330 |
| 2005/0122069 A1 | * | 6/2005 | Okada ...................... 318/116 |
| 2006/0028743 A1 | * | 2/2006 | Yamashita et al. ......... 359/824 |
| 2006/0140609 A1 | * | 6/2006 | Chen ......................... 396/85 |

FOREIGN PATENT DOCUMENTS

| | | |
|---|---|---|
| CN | 2539201 Y | 3/2003 |
| CN | 1629713 A | 6/2005 |
| CN | 1668069 A | 9/2005 |
| JP | 62262009 A * | 11/1987 |

* cited by examiner

*Primary Examiner*—Melissa J Koval
*Assistant Examiner*—Autumn Parker
(74) *Attorney, Agent, or Firm*—Steven M. Reiss

(57) ABSTRACT

An automatic focusing structure includes a holder (20), a barrel (10) and a piezoelectric actuator (30). The holder has a resistor (26) thereon. The barrel is slidably received in the holder. At least one lens element (12) received in the barrel, and an electrode (16) is located on an outer periphery wall of the barrel. The electrode slidably contacts the resistor. The actuator mounted under the barrel to move relative to the holder. When the barrel slides relative to the holder, the resistance value of the resistor is changed. Information from the resistor corresponds to a position information of the barrel, and the position information is feedback to the actuator so as to adjust the position of the barrel.

19 Claims, 1 Drawing Sheet

AUTOMATIC FOCUSING STRUCTURE AND DIGITAL CAMERA MODULE WITH SAME

TECHNICAL FIELD

The present invention relates generally to an automatic focusing structure, and more particularly, to an automatic focusing structure incorporated in a digital camera module, which may accurately control a barrel to move.

BACKGROUND

In cameras field, a focusing structure is one kind of structure which can be used for adjusting distance between the lens module and the image pickup device to make a clearer image when photographing objects at different distances from the camera.

A typical focusing structure of a camera includes a lens module, an image pickup device and a driving mechanism. In use a control drive circuit can automatically drive the driving mechanism. The driving mechanism further brings the lens module to move along the optical axis of the camera so that the distance between the lens module and the image pickup device is changed. However, the lens module often does not slide to a predetermined position because of function resistance or other factors. Furthermore, the focusing structure does not have a real-time detecting system for positioning the barrel. Therefore, the movement position of the lens module is not accurately controlled thus effecting the quality of the focus.

Therefore, a focusing structure is desired in order to overcome the above-described shortcomings.

SUMMARY

In one embodiment thereof, an automatic focusing structure includes a holder, a barrel and a piezoelectric actuator. The holder has a resistor thereon. The barrel is slidably received in the holder. At least one lens element is received in the barrel, and an electrode is located on an outer periphery wall of the barrel. The electrode slidably contacts the resistor. The actuator mounted under the barrel to move relative to the holder. When the barrel slides relative to the holder, the resistance value of the resistor is changed. Information of the resistor corresponds to a position information of the barrel, and the position information is fed back to the actuator so as to adjust the position of the barrel.

Other advantages and novel features will become more apparent from the following detailed description when taken in conjunction with the accompanying drawing.

BRIEF DESCRIPTION OF THE DRAWING

Many aspects of the focusing structure can be better understood with reference to the following drawing. The components in the drawing are not necessarily drawn to scale, the emphasis instead being placed upon clearly illustrating the principles of the digital camera module with the focusing structure. Like reference numerals designate corresponding parts throughout.

DETAILED DESCRIPTION OF THE EMBODIMENTS

Figure 1:
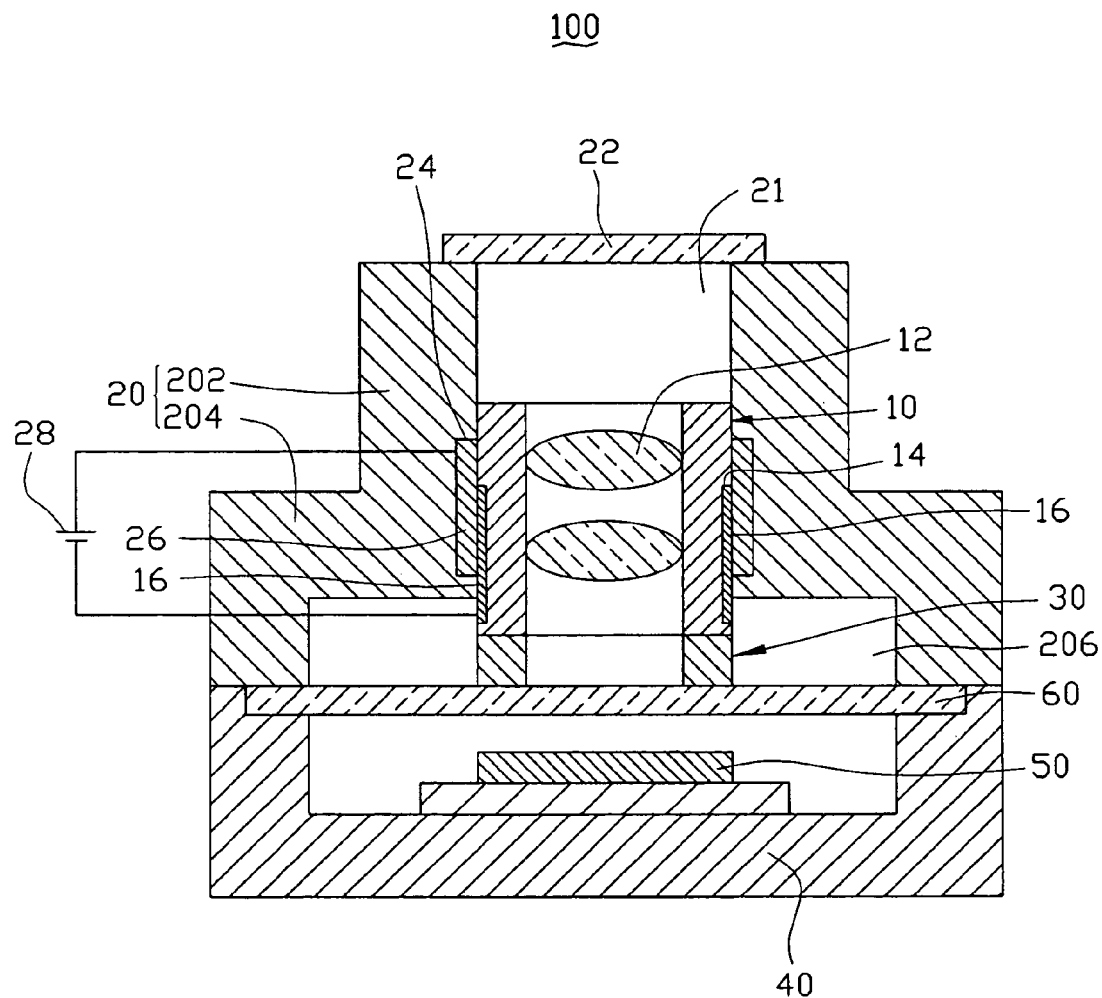
FIG. 1 is a cut-away view of an embodiment of a digital camera module with an automatic focusing structure.

Referring now to the drawing, FIG. 1 shows a digital camera module 100 with an automatic focusing structure, according to a preferred embodiment. The digital camera module 100 is adapted for use in a portable electronic device such as a mobile phone or a personal digital assistant (PDA), but the compact nature thereof could prove useful in compact digital camera units, digital camcorders or regular film cameras as well. The digital camera module 100 includes a barrel 10, a holder 20, an actuator 30, a base seat 40, an image sensor 50 and a cover 60.

The barrel 10 is a substantially hollow cylinder with two open ends so that light can be transmitted therethrough. Several lens elements 12 are disposed in the barrel 10, and receive light beams that enter from the outside. An outside periphery wall of the barrel 10 defines two symmetrical grooves 14. An electrode 16 is received in each groove 14. The shape and size of each electrode 16 corresponds to that of the grooves 14. Each electrode 16 may be mounted in a corresponding groove 14 by means of an adhesive.

The holder 20 includes a holder body 202 and a flange 204 formed at a rear end of the holder body 202. The holder body 202 is a cylinder, and defines a through hole 21 for slidably receiving the barrel 10. A board 22 is disposed at a front end of the holder body 202 so as to cover the through hole 21. The board 22 may be made of glass. As such, the glass board 22 protects the lens elements 12 from being scraped or otherwise abraded and keeps dust from entering the system. The flange 204 is a long cube, and defines a rectangular cavity 206 defined in a middle thereof opposite to the holder body 202. The rectangular cavity 206 communicates with the through hole 21 of the holder body 202 so that light can be transmitted therethrough. An outer diameter of the holder body 202 is smaller than an edge of the flange 204 so that a step is formed at a connection between them. An edge of the rectangular cavity 206 is larger than an inner diameter of the through hole 21. Two spaced notches 24 are defined on an inner periphery wall of the through hole 21. Each notch 24 receives a slice resistor 26. When the barrel 10 is received in the through hole 21 of the holder 20, each electrode 16 contacts with a corresponding resistor 26. The electrodes 16 and the resistors 26 further connect with an anode and a cathode of a power source 28, thereby forming a passive feedback unit. The barrel 10 may slide relative to the holder 20 so that the electrodes 16 also slide along the resistors 26. Therefore, the resistance value of the resistors 26 of the passive feedback unit changes so as to cause the output voltage to vary. This variation of the output voltage corresponds to the position variation of the barrel 10. The movement position information of the barrel 10 is further fedback to the actuator 30 so as to allow the accurate positioning of the barrel 10.

The actuator 30 is a piezoelectric element, which includes an insulative layer and a piezoelectric ceramic material covering the insulative layer. The actuator 30 is situated under the barrel 10. One end of the actuator 30 is mounted on a bottom of the barrel 10, the other end of the actuator 30 is fixed on the cover 60. The piezoelectric actuator 30 may be lengthened or shortened under the influence of an electric field, thereby bringing the barrel 10 to move along the axis of the barrel 10 upwards and downwards.

The base seat 40 forms a rectangular cavity. The base seat 40 is located under the holder 20 and is joined to the base seat 40.

The image sensor 50 is received in the base seat 40, and is adhered to the bottom of the base seat 40 via an adhesive means. The image sensor 50 can be a charge-coupled device (CCD) or a complementary metal-oxide semiconductor (CMOS). The image sensor 50 may convert the optical image data of an object into electronic signals.

The cover 60 is transparent and is laid over the image sensor 50 which receives light transmitted through the cover 60. The cover 60 is adhered on the base seat 40 by adhesive means and therefore seals the image sensor 50 in the base seat 40 so as to protect the image sensor 50 from contamination or pollution (i.e. by dust or water vapor).

In assembly, the image sensor 50 is mounted in the base seat 40. Then, the cover 60 is used to cover the base seat 40 so as to protect the image sensor 50. The electrodes 16 are adhered to their respective grooves 14 of the barrel 10. After that, the barrel 10 is fixed on the actuator 30, and the actuator 30 is mounted on the cover 60. The resistors 26 are respectively adhered to the notches 24 of the holder 20. The through hole 21 of the holder 20 is aligned with the barrel 10, and the holder 20 is placed around the barrel 10. At that time, each electrode 16 contacts with a corresponding resistor 26. Finally, the flange 204 of the holder 20 resists the base seat 40, and is joined to the base seat 40 by metallurgical means. The actuator 30 is connected with a control apparatus for providing control instructions to the actuator 30. The electrodes 16 and the resistors 26 are connected with the power source 28, thereby forming a passive feedback unit. Furthermore, the passive feedback unit is connected with the control apparatus for transmitting a feedback signal.

During operation, the control apparatus of the digital camera 100 receives the data from the control apparatus and gives a corresponding voltage to the actuator 30. The actuator 30 is lengthened so as to move the barrel 10 axially. The electrodes 16 of the barrel 10 slide relative to the resistors 26 of the holder 20. Accordingly, the voltage of the resistors 26 is changed. The position of the barrel 10 may be judged by means of the variation of the voltage value. The achieved signal is fedback to the control apparatus, the control apparatus then further adjusts the barrel 10 to a predetermined position to create an accurate focus.

A main advantages of the digital camera module 100 with a focusing structure is that the focusing operation can be controlled accurately and that the focusing structure of the digital camera module 100 is relatively simple.

In alternative embodiments, the actuator 30 may be disposed at other positions. In addition, the actuator 30 may be replaced by another driving mechanism for driving the barrel to move.

In a still further alternative embodiment, the resistor 26 may be adhered to the inner periphery wall of the through hole 21. The electrode may be directly adhered to the outer periphery wall of the barrel 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. An automatic focusing structure, comprising:
a holder including a resistor thereon;
a barrel slidably received in the holder, at least one lens element received in the barrel, an electrode located on an outer periphery wall of the barrel, the electrode slidably contacting with the resistor; and
a piezoelectric actuator, the piezoelectric actuator mounted under the barrel for moving the barrel relative to the holder;
wherein when the barrel slides relative to the holder, the resistance value of the resistor is changed, information of the resistor corresponds to a position information of the barrel, and the position information is fed back to the piezoelectric actuator so as to adjust the position of the barrel.

2. The automatic focusing structure as claimed in claim 1, wherein the outer periphery wall defines a groove, and the electrode is received in and adheres to the groove.

3. The automatic focusing structure as claimed in claim 1, wherein the holder includes a holder body and a flange, the holder body is a hollow cylinder, and the flange is a long cube.

4. The automatic focusing structure as claimed in claim 3, wherein the flange defines a rectangular cavity, and the rectangular cavity communicates with the holder body.

5. The automatic focusing structure as claimed in claim 1, wherein the holder defines a notch, and the resistor is received in the notch.

6. The automatic focusing structure as claimed in claim 1, wherein the electrodes and the resistors further connect with an anode and a cathode of a power source for providing the movement position of the lens module to the piezoelectric actuator, and the piezoelectric actuator further adjusts the position of the lens module.

7. A digital camera module, comprising:
a lens module including a barrel;
a holder carrying the lens module and defining a notch;
a piezoelectric actuator mounted to the lens module and configured for driving the lens module to slide relative to the holder;
a passive feedback unit configured for providing the movement position or the lens module to the piezoelectric actuator, and the piezoelectric actuator further adjusting the position of the lens module, the passive feedback unit including a resistor, an electrode and a power source connected to each other, the resistor being received in the notch, the electrode slidably contacting with the resistor; and
an image sensor, the image sensor mounted on the holder.

8. The digital camera module as claimed in claim 7, wherein an outer periphery wall of the barrel defines a groove, and the electrode is received and is adhered in the groove.

9. The automatic focusing structure as claimed in claim 7, wherein the piezoelectric actuator includes an insulative layer and a piezoelectric ceramic material covering the insulative layer.

10. The digital camera module as claimed in claim 7, wherein the holder includes a holder body and a flange, the holder body is a hollow cylinder, and the flange is a long cube.

11. The digital camera module as claimed in claim 10, wherein the flange defines a rectangular cavity, and the rectangular cavity communicates with the holder body.

12. A digital camera module comprising:
a lens holder including a resistor thereon;
a lens barrel telescopically received in the lens holder, the lens barrel having a front end and an opposite rear end, at least one lens fixed in the lens barrel, an electrode located on an outer periphery wall of the barrel, the electrode slidably contacting with the resistor, when the barrel slides relative to the holder, the resistance value of the resistor is changed, information of the resistor corresponds to a position information of the barrel;
an image sensor located facing the rear end of the lens barrel; and
a piezoelectric actuator attached to the rear end of the lens barrel, the position information of the barrel being fed back to the piezoelectric actuator, the piezoelectric actuator being configured for moving the lens barrel by piezoelectric deformation thereof when the piezoelectric actuator is energized.

13. The digital camera module of claim 12, wherein the piezoelectric deformation includes axial lengthening or shortening.

14. The digital camera module as claimed in claim 12, wherein the piezoelectric actuator includes an insulative layer and a piezoelectric ceramic material covering the insulative layer.

15. The digital camera module as claimed in claim 12, wherein the holder includes a holder body and a flange, the holder body is a hollow cylinder, and the flange is a long cube.

16. The digital camera module as claimed in claim 15, wherein the flange defines a rectangular cavity, and the rectangular cavity communicates with the holder body.

17. The digital camera module as claimed in claim 12, wherein the outer periphery wall of the barrel defines a groove, and the electrode is received in and adheres to the groove.

18. The digital camera module as claimed in claim 12, wherein the holder defines a notch, and the resistor is received in the notch.

19. The digital camera module as claimed in claim 12, wherein the electrodes and the resistors further connect with an anode and a cathode of a power source for providing the movement position of the lens module to the piezoelectric actuator, and the piezoelectric actuator further adjusts the position of the lens module.

* * * * *

UNITED STATES PATENT AND TRADEMARK OFFICE
CERTIFICATE OF CORRECTION

| | | |
|---|---|---|
| PATENT NO. | : 7,609,959 B2 | Page 1 of 1 |
| APPLICATION NO. | : 11/448574 | |
| DATED | : October 27, 2009 | |
| INVENTOR(S) | : Tai-Cherng Yu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Twelfth Day of October, 2010

David J. Kappos
*Director of the United States Patent and Trademark Office*